United States Patent [19]

Matsuo et al.

[11] Patent Number: 4,792,741
[45] Date of Patent: Dec. 20, 1988

[54] CONTROL UNIT FOR NON-CIRCULATING CURRENT TYPE CYCLOCONVERTER

[75] Inventors: Takayoshi Matsuo, Hyogo; Keiu Kawasaki, Gifu, both of Japan

[73] Assignee: Mitsubishi Denki Kabushiki Kaisha, Tokyo, Japan

[21] Appl. No.: 47,475

[22] Filed: May 11, 1987

[30] Foreign Application Priority Data

May 12, 1986 [JP] Japan .................. 61-108252

[51] Int. Cl.$^4$ .............................................. H02P 5/40
[52] U.S. Cl. ........................................ 318/800; 318/805; 318/723
[58] Field of Search ................ 318/800, 805, 807–811, 318/722, 723; 363/156–163

[56] References Cited

U.S. PATENT DOCUMENTS

| | | | |
|---|---|---|---|
| 3,775,649 | 11/1973 | Bayer et al. ............... | 318/702 |
| 4,088,932 | 5/1978 | Okuyama et al. ............ | 318/721 |
| 4,310,791 | 1/1982 | Akamatsu ................... | 318/808 |
| 4,447,787 | 5/1984 | Schwesig et al. ............ | 318/808 |
| 4,479,082 | 10/1984 | Schauder et al. ............ | 318/799 |

OTHER PUBLICATIONS

Ohm Magazine, "AC Variable Speed Drive by a Vector Control Cycloconverter", Apr. 1981, pp. 34–39.

Primary Examiner—David Smith, Jr.
Attorney, Agent, or Firm—Bernard, Rothwell & Brown

[57] ABSTRACT

The invention relates to a control unit to control a continuous cycloconverter of the non-circulating current type which performs frequency conversion of an AC power source using a semiconductor element a to perform commutation by the AC power source and variable speed operation of an AC motor. Sine/cosine waves as secondary magnetic flux directional signals are obtained by a sine/cosine wave generator based on the slip phase and the rotor phase of the motor; deviation between torque current set value supplied from a speed controller and torque current feedback value is outputted as torque voltage adjusted value by a torque current control element, and deviation between exciting current set value supplied from a magnetic flux controller and exciting current feedback value is outputted as exciting voltage adjusted value by an exciting current control element; the torque and exciting voltage adjusted values are converted into alternating voltage set values using the sine/cosine waves as parameters, and the torque current set value and the exciting current set value are converted into alternating current set values also using the sine/cosine waves as parameters; the alternating voltage set value and the alternating current set value converted are outputted to a control circuit to alternately operate switching of the semiconductor elements of positive and negative groups which constitute the cycloconverter, and the amplitude error and the phase error produced between the alternating current set value supplied to the cycloconverter and the alternating drive current actually supplied to the motor can be reduced significantly.

10 Claims, 4 Drawing Sheets

CONTROL UNIT FOR NON-CIRCULATING CURRENT TYPE CYCLOCONVERTER

BACKGROUND OF THE INVENTION

1. Field of the Invention

The present invention relates to a control unit to control a cycloconverter which is used in variable speed operation of an AC motor such as a synchronous motor, an induction motor or the like, and performs frequency conversion of an AC power source using, for example, a thyristor element to perform commutation by the AC power source. More particularly, the invention relates to a control unit wherein a continuous cycloconverter of the non-circulating current type which is the most suitable to drive an induction motor a is operated accurately with very small phase error and very small amplitude error in three phase current control.

2. Description of the Prior Art

According to development of power electronics and social needs in recent years, rotation drive devices in various industrial fields, for example, a control system for an AC motor such as an induction motor are significantly varied. In other words, because of rapid development in thyristor elements and their control circuit technology, application of a cycloconverter to a driving power source of an AC motor or the like is becoming active. The cycloconverter is a static frequency conversion device where two rectifier circuits of the same sort (called positive and negative converters for convenience) are connected in anti-parallel connection and alternately operated by an AC power source so as to obtain alternating voltage with a frequency different from that of the power source.

FIG. 1 is a block constitution diagram illustrating a control unit for a cycloconverter of the non-circulating current type in the prior art disclosed, for example, an article "AC variable speed drive by a vector control cycloconverter" in OHM Magazine, April 1981. In FIG. 1, numeral 1 designates a speed setting device, numeral 2 designates a speed controller, numeral 3 designates a magnetic flux command operator, numeral 4 designates a magnetic flux controller, numeral 5 designates a magnetic flux operator, numeral 6 designates a divider, numerals 7, 8 designate vector rotation devices, numeral 9 designates a two-phase/three-phase conversion circuit, numeral 10 designates an armature current controller, numeral 11 designates a gate controller for armature current, numeral 12 designates an AC power source, numeral 13 designates a sinusoidal cycloconverter of the three-phase non-circulating current type (hereinafter referred to as "three-phase cycloconverter"), numeral 14 designates a synchronous motor, numeral 15 designates a rotor position detector, numeral 16 designates a tacho generator, numeral 17 designates a field current controller, numeral 18 designates a gate controller for field current, numeral 19 designates a field coil, and numeral 20 designates a switching thyristor of the coil 9. FIG. 2 is a circuit constitution diagram illustrating a current control circuit of one phase. In FIG. 2, numeral 21 designates a current transformer, and numeral 22 designates a load including the synchronous motor 14.

Next, the operation will be described. Torque set value $T_e^*$ is supplied by the speed controller 2 and divided by magnetic flux $\Phi$ in the divider 6 so as to obtain torque current set value $i_T^*$. In this case, magnetizing current set value $i_m^*$ is made zero for the operation in motor power factor $\cos\phi_M = 1$. The torque current set value $i_T^*$ and the magnetizing current set value $i_M^*$ are quantities viewed from the rotating magnetic flux axis and therefore DC quantities. In order to convert these set values into actual armature current (AC quantity), these values are first converted into two-phase alternating currents $i_\alpha^*$, $i_\beta^*$ by the vector rotation device 7 using the magnetic flux directional signals $\cos\phi$, $\sin\phi$ as parameters obtained from the rotor position detector 15, the vector rotation device 8 and the magnetic flux operator 5. The converted two-phase alternating currents $i_{60}^*$, $i_\beta^*$ are further converted into three-phase alternating current set values $i_R^*$, $i_S^*$, $i_T^*$ by the two-phase/three-phase conversion circuit 9. The three-phase cycloconverter 13 has a current control loop per each phase using the alternating currents $i_R^*$, $i_S^*$, $i_T^*$ as set values, and is operated by the current controller 10 and the gate controller 11 for armature current so that the output currents $i_R$, $i_S$, $i_T$ of the three-phase cycloconverter 13 coincide with the set values $i_R^*$, $i_S^*$, $i_T^*$.

Thus the three-phase cycloconverter 13 is operated by the current control loop as shown in FIG. 1. This current control loop will be described by a current control circuit of one phase shown in FIG. 2. Current command of AC quantity, being the alternating current set value $i_R^*$, is given and compared with the output current $i_R$ flowing through the load 21, and the deviation $\epsilon$ is amplified by the current controller 10 and then supplied as the voltage command $V_R^*$ to the three-phase cycloconverter 13. In such control manner, the load current $i_R$ coinciding with the alternating current set value $i_R^*$ as the command value is intended to flow.

Since the control unit for the cycloconverter of non-circulating current type in the prior art is constituted as above described, when the output frequency becomes higher due to the delay element of the current control circuit, an amplitude error and a phase error will be produced between the alternating current set value $i_R^*$ and the load current $i_R$ as shown in FIG. 3.

SUMMARY OF THE INVENTION

An object of the invention is to provide a control unit for a cycloconverter of non-circulating current type wherein the amplitude error and the phase error produced between the alternating current set value supplied to the cycloconverter and the driving alternating current supplied to the load such as an AC motor can be reduced significantly.

In order to attain the above object, a control unit for a cycloconverter of non-circulating current type according to the invention consists in that the result of adding the rotor phase to the slip phase obtained by integrating the slip frequency is used as input and the secondary magnetic flux directional signal is obtained by a sine/cosine wave generator, a deviation obtained by comparing the torque current set value supplied by a speed controller with the torque current feedback value is inputted to the torque current controller, a deviation obtained by comparing the exciting current set value supplied by the magnetic flux controller with the exciting current feedback value is inputted to the exciting current controller, outputs of both current controllers are converted into an alternating voltage set value using the secondary magnetic flux directional signal, the torque current set value and the exciting current set value are converted into an alternating current set value using the secondary magnetic flux directional signal, and a gate controller is installed so that a positive group converter or a negative group converter of the three-phase cycloconverter is alternately operated by the alternating current set value.

DETAILED DESCRIPTION OF THE PREFERRED EMBODIMENTS

Preferred embodiments of control units for non-circulating current type cycloconverters according to the invention will now be described in detail referring to the accompanying drawings.

Figure 1:
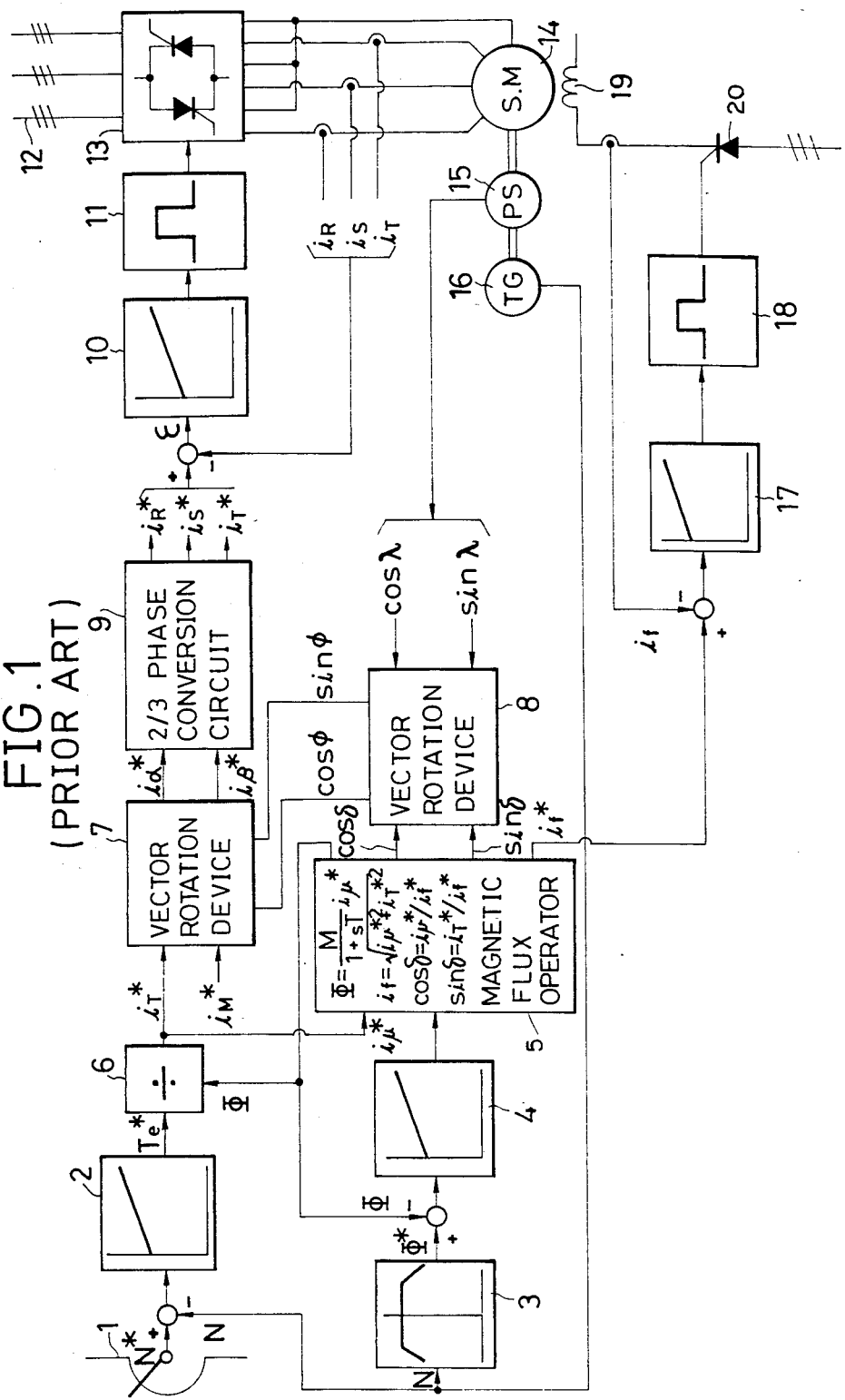
FIG. 1 is a block constitution diagram illustrating an example of circuit constitution of a control unit for a cycloconverter of the non-circulating current type in the prior art.
Figure 2:
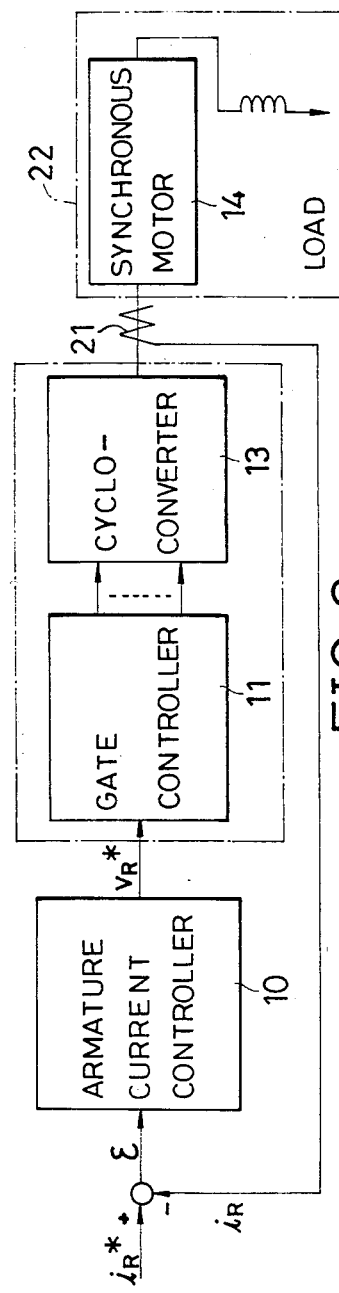
FIG. 2 is a block constitution diagram illustrating a gate control circuit of one phase in the cycloconverter shown in FIG. 1.
Figure 3:
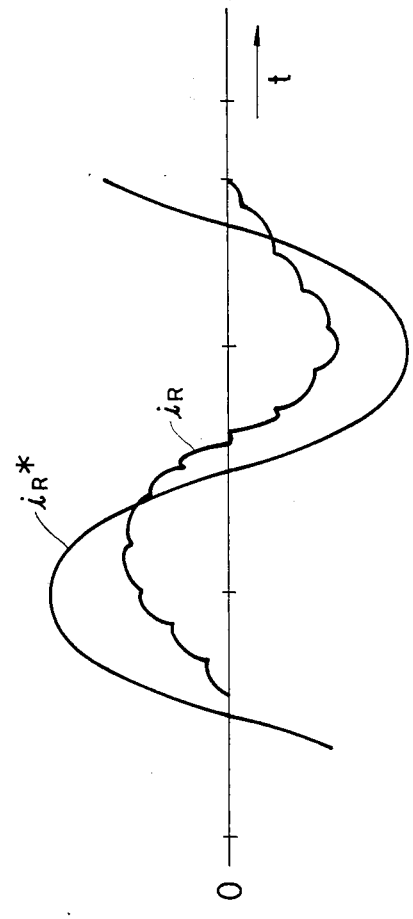
FIG. 3 is a waveform chart illustrating the error between current set value by control of the cycloconverter shown in FIG. 1 the actual current value.
Figure 4:
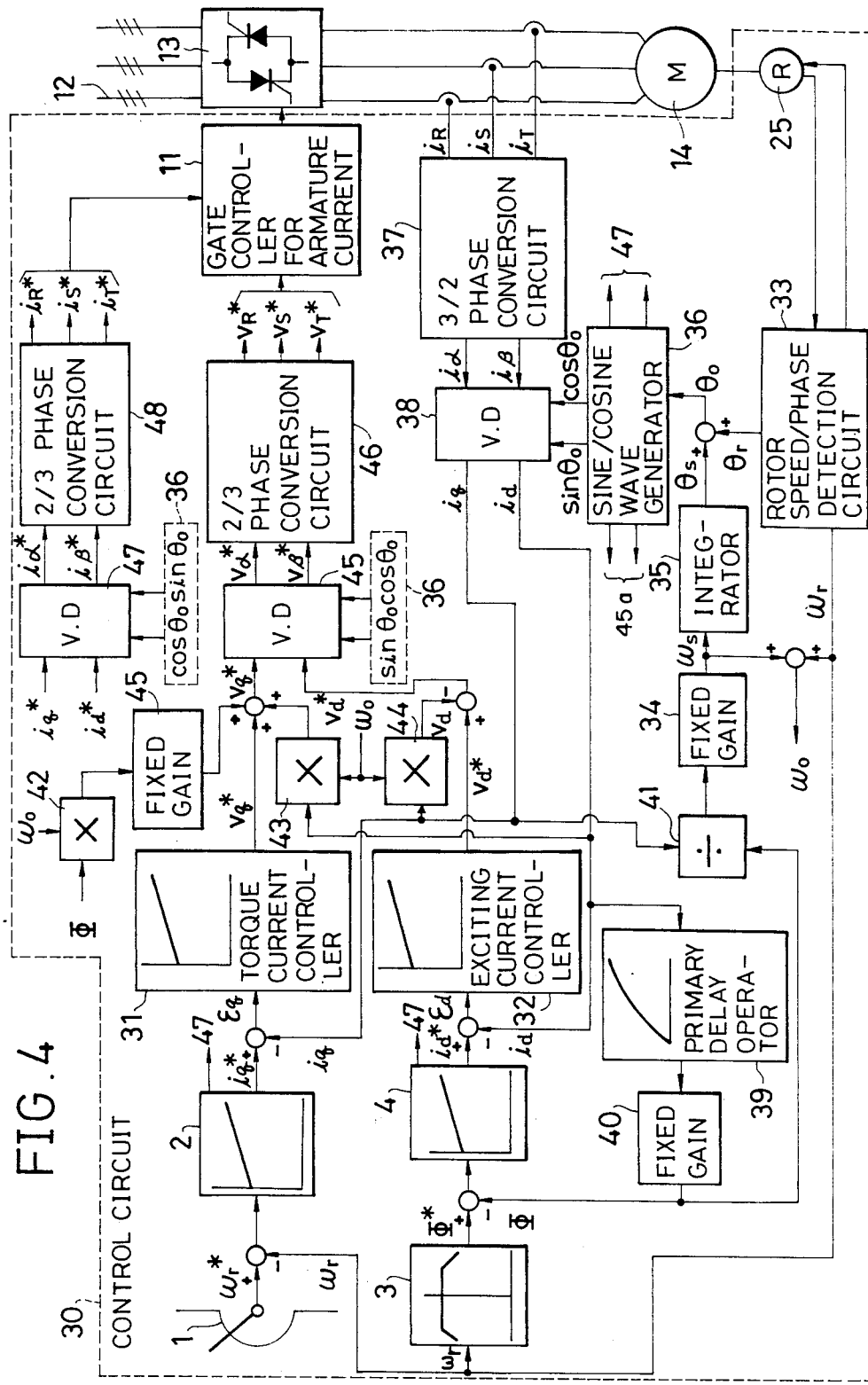
FIG. 4 is a block constitution diagram illustrating circuit constitution of a control unit for a cycloconverter of non-circulating current type as an embodiment of the invention.
Figure 5:
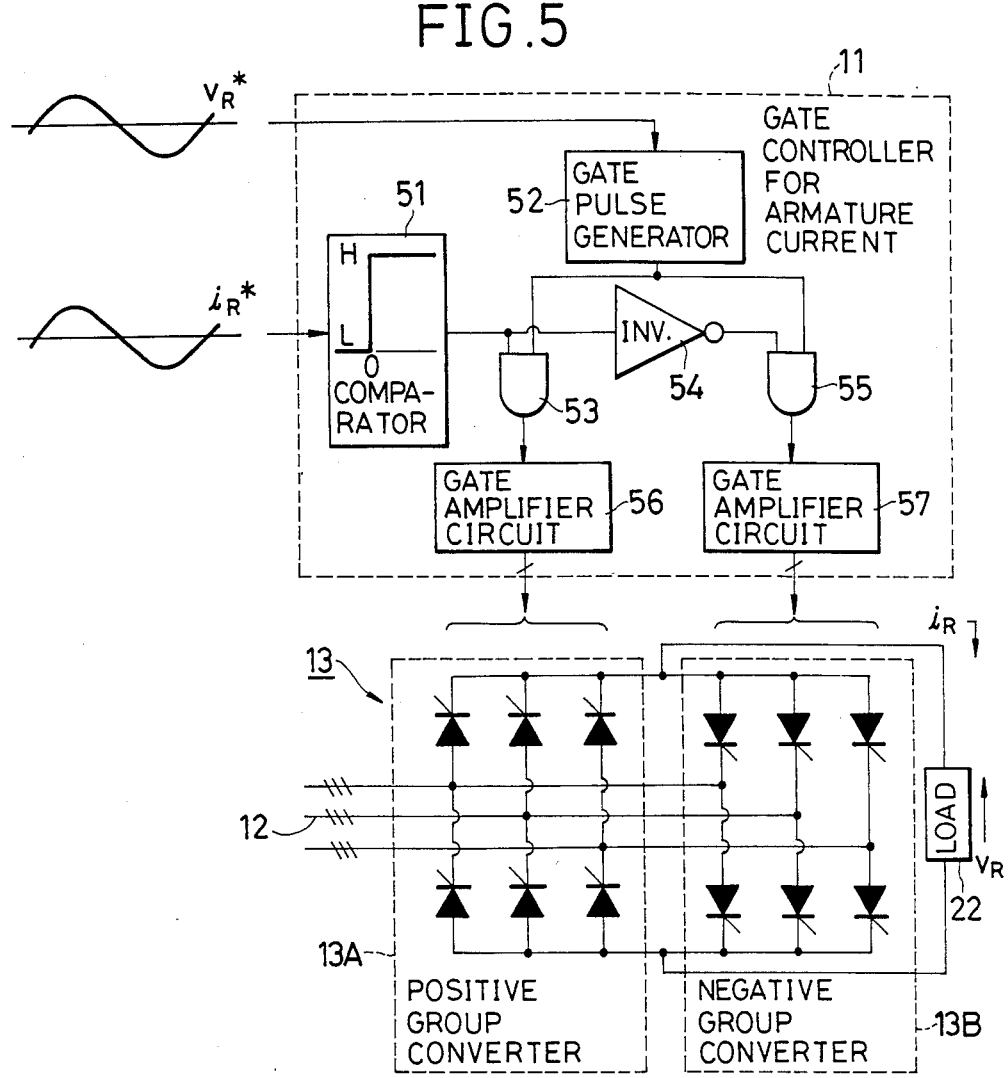
FIG. 5 is a block constitution diagram illustrating a gate control circuit of one phase in the cycloconverter shown in FIG. 4.
Figure 6:
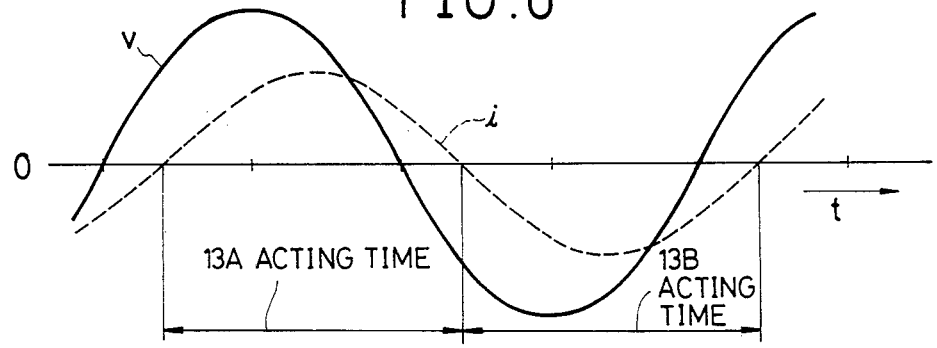
FIG. 6 is a waveform chart illustrating voltage and current waveforms of one phase in the gate control circuit shown in FIG. 5 as well as the acting region of positive and negative group converters.

FIG. 4–FIG. 6 are block constitution diagrams and a waveform chart illustrating an embodiment of the invention. Parts in FIG. 4–FIG. 6 designated by the same reference numerals as those in FIG. 1–FIG. 3 are the same or equivalent components, and the overlapped description shall be omitted. In FIG. 4, a control circuit 30 of a cycloconverter 13 comprises following components. A torque current controller 31 being a proportional integration amplifier, for example, and a torque current control means is installed, and deviation $\epsilon_q$ between the torque current set value $i_q*$ outputted from the speed controller 2 and the torque current feedback value $i_q^-$ is supplied to the torque current controller 31. An exciting current controller 32 being a proportional integration amplifier, for example, and an exciting current adjusting means is installed at output side of the magnetic flux controller 4, and deviation $\epsilon_d$ between the exciting current set value $i_d*$ as output of the magnetic flux controller 4 and the exciting current feedback value $i_d^-$ is inputted to the current controller 32. A resolver 25 detects a rotor speed $\Omega_r$ and a rotor phase $\theta_r$ of the induction motor 14 as an AC motor, and a rotor speed/phase detection circuit 33 is connected to the resolver 25. An integrator 35 integrates a slip frequency $\omega_s$ as fixed gain 34, and a sine/cosine wave generator 36 generates sine/cosine waves based on a secondary magnetic flux phase $\theta_0$ as deviation between two phases, i.e., the rotor phase $\theta_r$ detected by the detection circuit 33 and the slip phase $\theta_s$ obtained by integration in the integrator 35. A three-phase/two-phase conversion circuit 37 converts three-phase AC currents $i_R$, $i_S$, $i_T$ supplied from the cycloconverter 13 to the motor 14 into two-phase alternating current $i_\alpha$, $i_\beta$, and the three-phase/two-phase conversion circuit 37 and the sine/cosine wave generator 36 are connected to a vector rotation device 38. Exciting feedback current $i_d^-$ outputted from the vector rotation device 38 is supplied through a primary delay operator 39 to a fixed gain 40, and feedback current value $i_q^-$ is divided by a divider 41 and then outputted to the fixed gain 34.

The slip frequency $\omega_s$ as the output of the fixed gain 34 and the rotor speed $\omega_r$ as one output of the detector 33 are added into output $\omega_o$ which is constituted to be outputted to multipliers 42, 43 and 44. Output of a fixed gain 45 to which output of the multiplier 42 is supplied and output of the multiplier 43 are added to output $V_q*$ of the torque current controller 31 so as to produce set output $v_q*$. The set output $v_q*$, and deviation output $v_d*$ between output $V_d*$ of the exciting current controller 32 and output of the multiplier 44 are supplied to a vector rotation device 45a, and a two-phase/three-phase conversion circuit 46 is installed at output side of the vector rotation device 45a.

The torque current set value $i_q*$ as output of the speed controller 2 and the magnetic flux current set value $i_d*$ as output of the magnetic flux controller 4 are supplied also to a vector rotation device 47, and a two-phase/three-phase conversion circuit 48 is installed at output side of the vector rotation device 47.

Next, operation will be described.

The secondary magnetic flux directional signals $\sin\phi_o$, $\cos\phi_o$ will be first determined. The rotor phase $\phi_r$ of the induction motor 14 is detected by the resolver 25 and the rotor speed/phase detection circuit 33, and by integrating the slip frequency $\omega_s$ by the integrator 35 thereby the secondary magnetic flux phase $\theta_o$ is obtained. The secondary magnetic flux phase $\theta_o$ is inputted to the sine/cosine wave generator 36 thereby the secondary magnetic flux directional signals $\sin\phi_o$, $\cos\theta_o$ are obtained.

The torque current feedback value $i_q^-$ and the exciting current feedback value $i_d^-$ are determined in that the three-phase output currents $i_R$, $i_S$, $i_T$ of the induction motor 14 are converted by the three-phase/two-phase conversion circuit 37 into the two-phase alternating currents $i_\alpha$, $i_\beta$ which are further converted using the secondary magnetic flux directional signals $\sin\theta_o$, $\cos\theta_o$ as parameters by the vector rotation device 38 into a value in the secondary magnetic flux rotation coordinate system as DC quantity.

The torque current set value $i_q*$ is given by the speed controller 2 and compared with the torque current feedback value $i_q^-$, and the deviation $\epsilon_q$ between both values $i_q*$, $i_q^-$ is inputted to the torque current controller 31. The exciting current set value $i_d*$ is given by the magnetic flux controller 4 and compared with the exciting current feedback value $i_d^-$, and the deviation $\epsilon_d$ between both values $i_d*$, $i_d^-$ is inputted to the exciting current controller 32. The torque voltage adustment value $V_q*$ as output of the torque current controller 31 and the exciting voltage adjustment value $V_d*$ as output of the exciting current controller 32 are converted using the secondary magnetic flux directional signals $\sin\theta_o$, $\cos\theta_o$ as parameters by the vector rotation device 45a into the two-phase alternating voltage $v_\alpha*$, $v_\beta*$, which are further converted by the two-phase/three-phase conversion device 46 into the three-phase alternating voltage set values $v_R*$, $V_S*$, $v_T*$. On the other hand, the torque current set value $i_q*$ and the exciting current set value $i_d*$ both supplied to the vector rotation device 47 are converted using the secondary magnetic flux directional signals $\sin\theta_o$, $\cos\theta_o$ as parameters into the two-phase alternating currents $i_\alpha^*$, $i_\beta^*$, which are further converted by the two-phase/three-phase conversion circuit 48 into the three-phase alternating current set values $i_R^*$, $i_S^*$, $i_T^*$. The three-phase cycloconverter 13 obtains a gate signal from the three-phase alternating current set values $i_R^*$, $i_S^*$, $i_T^*$ and the three-phase alternating voltage set values $v_R^*$, $v_S^*$, $v_T^*$ both supplied to the gate controller 11, and the output voltages $v_R$, $v_S$, $v_T$ of the three-phase cycloconverter 13 are operated to coincide with the three-phase alternating voltage set values $v_R^*$, $v_S^*$, $v_T^*$ by the gate signal.

Operation of the gate controller 11 will now be described. FIG. 5 shows constitution to perform control of the gate controller 11 in one phase. In FIG. 5, the gate controller 11 is composed of a comparator 51 to which the alternating current set value $i_R^*$ is supplied a gate pulse generator 52 to which the alternating voltage set value $v_R^*$ is supplied, an AND circuit 53 which transmits an output signal when the outputs of both the comparator 51 and the gate pulse generator 52 are positive, an inverter 54 as a NOT circuit to which the output of the comparator 51 is supplied, an AND circuit 55 to which the outputs of the inverter 54 and the gate pulse generator 52 are supplied, a gate amplifier circuit 56 which performs switching operation of gates of the positive group converter 13A of the three-phase cycloconverter 13 based on the output of the AND circuit 53, and a gate amplifier circuit 57 which performs switching operation of gates of the negative group converter 13B of the three-phase cycloconverter 13 based on output of the AND circuit 55. The gate controller 11 is supplied with the alternating current set value $i_R^*$ and the alternating voltage set value $v_R^*$ in one phase, and the gate pulse generator 52 supplies gate pulses of a prescribed period to the AND circuits 53, 55. In this constitution, when the alternating current set value $i_R^*$ is positive, the output of the comparator 51 becomes high level H, and based on the high level output of the comparator 51 and gate pulse from the gate pulse generator 52 the AND circuit 53 transmits the AND output to the gate amplifier circuit 56 which opens the gate of the positive group converter 13A of the three-phase cycloconverter 13. When the alternating current set value $i_R^*$ is negative, output of the comparator 51 becomes low level L, and based on the output supplied in inversion through the inverter 54 to the AND circuit 55 and gate pulse the AND output is transmitted to the gate amplifier 57 which opens gate of the negative group converter 13B of the three-phase cycloconverter 13. In order to change the gate from the positive group converter 13A to the negative group converter 13B, of course, the interlock time is set when the current value supplied to the three-phase cycloconverter 13 becomes zero. FIG. 6 illustrates characteristics that both positive and negative converters 13A, 13B are changed before and after the interlock time. As shown in FIG. 6, voltage v and current i of one phase of the three-phase cycloconverter 13 become sinusoidal waves of definite period.

In the slip frequency control system of the two-axis current control type on the secondary magnetic flux coordinates, since all current control system is DC quantity, the current controller is made a proportional integrating amplifier and thereby the set value becomes completely coincident with the feedback value.

According to the invention as above described in detail, in the slip frequency control system of the two-axis direct current control type where the torque current and the exciting current on the rotary secondary magnetic flux coordinate axis of the motor are separately controlled as DC quantity, since the alternating current set value is synthesized from the torque current set value and the exciting current set value using the secondary magnetic flux directional signals, a control unit for a cycloconverter of non-circulating current type can be provided so that the amplitude error and the phase error between the load such as an AC motor and the alternating current set value for the control can be made very small.

What is claimed is:

1. A control unit for a cycloconverter of noncirculating current type, which is composed of a speed control means for adjusting rotational speed of a motor as a load, a magentic flux control means to control a magnetic flux produced in an exciting means of the motor, and a gate control means to control switching of a gate of a commutation means of the cycloconverter on non-circulating current type, said control unit comprising:

a rotor speed/phase detection circuit for detecting rotor phase and rotor speed, means connected to said rotor speed/phase detection circuit for determining slip frequency from rotor speed, and an integrator for converting slip frequency to slip phase;

sine/cosine wave generating means for outputting sine/consine waves as secondary magnetic flux directional signals based on secondary magnetic flux phase, said sine/consine wave generating means being connected to said rotor phase/speed detection circuit and to said integrator for receiving the deviation between said rotor phase and said slip phase;

a torque current control means connected to said speed control means and to the output of the cycloconverter for receiving as input deviaiton between a torque current set value supplied from said speed control means and a torque current feedback value obtained from the output current of the cycloconverter, and for outputting definite torque voltage adjusted value based on the deviation;

an exciting current control means for receiving as input deviation between an exciting current set value supplied from said magnetic flux control means and an exciting current feedback value obtained from the output current, and for outputting a definite exciting voltage adjusted value based on the deviation;

a current set value conversion means connected to said speed control means and to said magnetic flux control means and to said sine/cosine wave generating means for converting the torque current set value and the exciting current set value into an alternating current set value, and for outputting the alternating current set value to said gate control means; and a voltage set value conversion means connected to said torque current control means and to said exciting current control means and to said sine/cosine wave generating means for converting the the output of said torque current control means and the output of said exciting current control means into an alternating voltage set value, and for outputting the alternating voltage set value to said gate control means.

2. A control unit for a cycloconverter as set forth in claim 1, wherein said rotor speed/phase detection circuit including a resolver installed as a rotor phase detecting means, said rotor speed/phase detection circuit being connected to said sine/cosine wave generating means for providing an adding element of slip phase inputted to said sine/consine wave generating means.

3. A control unit for a cycloconverter as set forth in claim 1, wherein a current feedback value conversion means is provided to convert the output current of the cycloconverter into a torque current feedback value and an exciting current feedback value.

4. A control unit for a cycloconverter as set forth in claim 3, wherein said current feedback value conversion means comprises a three-phase/two-phase conversion circuit connected to the output of the cycloconverter for converting the output current of said cycloconverter from three-phase alternating current into two-phase alternating current, and a vector rotation device connected to said three phase/two phase conversion circuit and to said sine/cosine wave generating means for converting the converted two-phase alternating current into the torque current feedback value and the exciting current feedback value.

5. A control unit for a cycloconverter as set forth in claim 1, wherein said torque current control means is a proportional integrating amplifier.

6. A control unit for a cycloconverter as set forth in claim 1, wherein said exciting current control means is a proportional integrating amplifier.

7. A control unit for a cycloconverter as set forth in claim 1, wherein the exciting current deviation value inputted to said exciting current controller is the deviation between the exciting current set value which is obtained by processing the deviation between a magnetic flux value and a magnetic flux set value using the magnetix flux control means, said control unit including a primary delay operator for receiving the exciting current feedback value and a fixed gain connected to said delay operator and to said magnetic flux control means, said control circuit further including a divider connected to receive the torque current feedback value; said magnetic flux value being obtained by synthesizing the exciting current feedback value supplied through said primary delay operator and said fixed gain with the torque current feedback value supplied through said divider, said magnetic flux set value being obtained by processing the actual rotor speed detected from the motor using a magnetic flux command operator and said exciting current feedback value.

8. A control unit for a cycloconverter as set forth in claim 1, wherein said current set value conversion means comprises a vector rotation device connected to said speed control means and to said magnetic flux control means and to said sine/cosine wave generating means for inputting both the torque current set value and the exciting current set value and for converting both values into two-phase alternating currents; and a two-phase/three-phase conversion circuit connected to said vector rotation device for converting the two-phase alternating currents being output of said vector rotation device into three-phase alternating current set values; said two-phase/three-phase conversion circuit being connected to said gate control means for supplying said three-phase alternating current set values to said gate control means.

9. A control unit for a cycloconverter as set forth in claim 1, wherein said voltage set value conversion means comprises a vector rotation device connected to said torque current control means and to said exciting current control means and to said sine/consine wave generating means for inputting both the torque voltage adjusted value outputted from said torque current control means and the exciting voltage adjusted value outputted from said exciting current control means, and for converting both input values into two-phase alternating voltages; and a two-phase/three-phase conversion circuit connected to said vector rotation device for converting the two-phase alternating coltages from said vector rotation device into three-phase alternating voltage set values; said two-phase/three-phase conversion circuit being connected to said gate control means for supplying said three-phase alternating voltage set values to said control means.

10. A control unit for a cycloconverter as set forth in claim 6 wherein the exciting current deviation value inputted to said exciting current controller is the deviation between the exciting current set value which is obtained by processing the deviation between a magnetic flux value and a magnetic flux set value using the magnetic flux control means, said control unit including a primary delay operator for receiving the exciting current feedback value and a fixed gain connected to said delay operator and to said magnetic flux control means, said control circuit further including a divider connected to receive the torque current feedback value; said magnetic flux value being obtained by synthesizing the exciting current feedback value supplied through said primary delay operator and said fixed gain with the torque current feedback value supplied through said divider, said magnetic flux set value being obtained by processing the actual rotor speed detected from the motor using a magnetic flux command operator and said exciting current feedback value.

* * * * *

UNITED STATES PATENT AND TRADEMARK OFFICE
CERTIFICATE OF CORRECTION

PATENT NO. : 4,792,741

DATED : December 20, 1988

INVENTOR(S) : Takayoshi Matsuo et al.

It is certified that error appears in the above-identified patent and that said Letters Patent is hereby corrected as shown below:

In column 2 of the Abstract, line 3, after "element" delete "a" (second occurrence).

Column 1, line 15, after "type" insert --,--;
line 16, after "motor" insert --,--;
same line, delete "a";
line 24, after "motor" insert --,--;
line 38, after "example" insert --in--;
line 60, "9" should be --19--.

Column 2, line 1, "$i_m$*" should be --$i_M$*--;
line 13, "$i_{60}$*" should be --$i_\alpha$*--.

Column 3, line 17, after the numeral "1" insert --and--;
line 56, "$\Omega_r$" should be --$\omega_r$--.

Column 4, line 31, after "and" (second occurrence), insert --the rotor phase $\theta_r$ is added to the slip phase $\theta_s$ obtained--;
line 64, delete the word "phase" (first occurrence);
line 65, "$V_s$*" should be --$v_s$*--.

Column 5, line 17, after "supplied" insert --,--;
line 31, after "on" insert --the--.

Column 6, lines 14 and 15, "noncirculating" should be --non-circulating--;
line 17, "magentic" should be --magnetic--;
line 39, "deviaiton" should be --deviation--;
line 43, after "outputting" insert --a--;
line 63, delete "the" (second occurrence).

Column 7, line 7, "consine" should be --cosine--.

UNITED STATES PATENT AND TRADEMARK OFFICE
CERTIFICATE OF CORRECTION

PATENT NO. : 4,792,741

DATED : December 20, 1988

INVENTOR(S) : Takayoshi Matsuo et al.

It is certified that error appears in the above-identified patent and that said Letters Patent is hereby corrected as shown below:

Column 8, line 18, "consine" should be --cosine--.

Signed and Sealed this

Twenty-seventh Day of February, 1990

*Attest:*

JEFFREY M. SAMUELS

*Attesting Officer*  Acting Commissioner of Patents and Trademarks